United States Patent Office 2,735,851
Patented Feb. 21, 1956

2,735,851
ALKANOLPYRIDINE-N-OXIDES

Francis E. Cislak, Indianapolis, Ind., assignor to Reilly Tar & Chemical Corporation, Indianapolis, Ind., a corporation of Indiana No Drawing. Application September 1, 1954,
Serial No. 453,689

7 Claims. (Cl. 260—297)

This invention relates to alkanolpyridine-N-oxides and to the process of making them. The alkanolpyridine-N-oxides which are the subject of this invention have the following general formula:

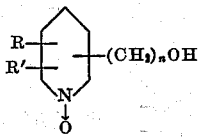

where $n$ is 2 to 4 and R and R' are hydrogen or alkyl.

In 1926 Meisenheimer [Ber. 59, 1848 (1926)] discovered that pyridine can be oxidized to pyridine-N-oxide by mixing pyridine with a benzene solution of perbenzoic acid. Recent studies have shown that pyridine can be converted to the -N-oxide in good yields by using hydrogen peroxide as the oxidant.

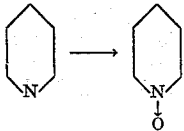

Alkylpyridines, such as picolines and lutidines, may be converted to the corresponding -N-oxides by carefully controlled oxidation. The alkyl groups themselves may be oxidized. One cannot predict what will happen when one undertakes to convert an alkylpyridine to the corresponding alkylpyridine-N-oxide. Thus, I found that when I subjected 2,6-lutidine in acetic acid to oxidation with hydrogen peroxide under the conditions we had previously used to convert pyridine to pyridine-N-oxide, I did not obtain 2,6-lutidine-N-oxide but instead recovered 2-carboxy-6-methylpyridine-N-oxide.

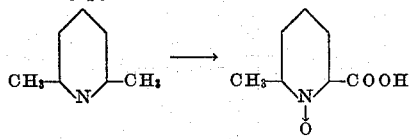

The presence of easily oxidizable groups on the pyridine makes it difficult, if at all possible, to prepare the pyridine-N-oxide of the compound. Thus, 2-amino-pyridine has a readily oxidizable amino group. It is the amino group that is oxidized when 2-aminopyridine is subjected to oxidation with hydrogen peroxide; a high yield of 2-nitropyridine is formed [Wiley, J. Amer. Chem. Soc. 73, 494 (1951)]. 2-Aminopyridine-N-oxide has been prepared by Newbold and Spring by a many-step roundabout process (J. Chem. Soc. 1949, 133–5). They used peroxide to convert picolinic acid to picolinic acid-N-oxide, then esterified the -N-oxide to make methyl picolinate-N-oxide, converted that ester to picolinamide-N-oxide, and finally by the Hoffman degradation made 2-aminopyridine-N-oxide.

It occurred to me that if I could prepare an alkanolpyridine-N-oxide, I might be able to convert it to a pyridyl glycol. The presence of so readily an oxidizable group as an alcohol group mitigates against the possibility of oxidizing the alkanol pyridine to the corresponding alkanolpyridine-N-oxide. It occurred to me that I might be able to protect the alcohol group against oxidation by peroxide and thus be able to convert the alkanolpyridine to the -N-oxide without oxidizing the alcohol group. But I was not certain that if I protected the hydroxyl group I would not oxidize one of the other carbon atoms of the alkanol chain, for example, the peroxide might attack the carbon adjacent to the pyridine ring.

I found that by esterifying the alkanolpyridine I could successfully introduce the -N-oxide group. Then by hydrolysis I could regenerate the free alcohol group and thereby obtain the desired alkanolpyridine-N-oxide.

The process of preparing pyridyl glycols from the alkanolpyridine-N-oxides is the subject of my co-pending application Serial No. 453,688, filed even date herewith.

The following specific examples illustrate the process of my invention. The parts are by weight.

EXAMPLE 1

2-propan-3-olpyridine-N-oxide [2-pyridine-propan-3-ol, N-oxide]

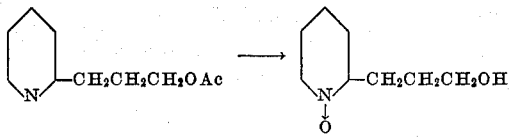

To a solution of 179 parts of 2-propan-3-olpyridine acetate and about 180 parts of glacial acetic acid heated to a temperature of about 75° C. there is added about 150 parts of hydrogen peroxide (50%). The hydrogen peroxide is preferably added in small portions during a four-hour period. The temperature of the solution is maintained at 75° C. during the addition of the hydrogen peroxide. After all of the hydrogen peroxide has been added, the solution is maintained at a temperature of 75° C. to 85° C. for an additional 16–20 hours. Then the temperature of the solution is raised to about 95° C. and paraformaldehyde is added to destroy any unreacted hydrogen peroxide. The absence of hydrogen peroxide is readily established by testing with potassium iodide. The peroxide free solution is concentrated by distilling off the water and most of the acetic acid. The 2-propanolpyridine-N-oxide formed during the above reaction may be recovered from the concentrated acetic acid solution in several ways. One convenient way is as follows: To the residue remaining after the removal of the water and acetic acid is added about 750 parts of a 10% aqueous caustic soda solution. The resulting mixture is heated at reflux conditions for about four to six hours. The water is then removed by evaporation under vacuum. The residue is extracted with benzene; the benzene extract contains the 2-propanolpyridine-N-oxide. Evaporation of the benzene yields 2-propanol-pyridine-N-oxide of high purity.

Instead of the acetate of propanolpyridine, I may use other esters, such for example, as the propionate. Or, instead of separately preparing the ester, I may start with propanolpyridine, prepare the ester in the acetic acid solution and proceed to carry out my oxidation. If I choose to start with the propanolpyridine, I may use the procedure described in Example 2.

EXAMPLE 2

4-propan-3-olpyridine-N-oxide [4-pyridine-propan-3-ol, N-oxide]

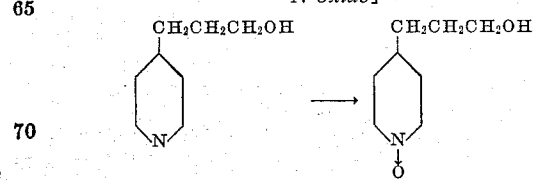

A solution of 150 parts of 4-propan-3-olpyridine and about 280 parts of glacial acetic acid is heated under reflux conditions for about four hours. The solution is then cooled to a temperature of about 75° C. and to it is added about 200 parts of hydrogen peroxide (35%). From here on the procedure of Example 1 (from the point where the hydrogen peroxide has been added) is followed. 4-Propan-3-ol-pyridine-N-oxide is obtained in good yield.

EXAMPLE 3

*2-ethan-2-olpyridine-N-oxide [2-pyridine-ethan-2-ol, N-oxide]*

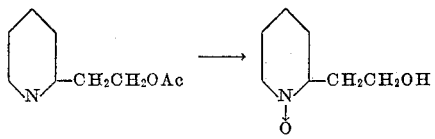

The procedure of Example 1 is followed save that the acetate of 2-ethan-2'-olpyridine is used in place of the 2-propan-3-olpyridine acetate and 2-ethan-2-olpyridine-N-oxide is recovered.

EXAMPLE 4

*4-butan-4'-olpyridine-N-oxide [4-pyridine-butan-4-ol, N-oxide]*

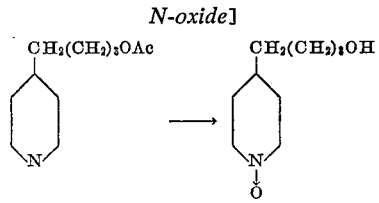

The procedure of Example 1 is repeated except that the acetate of 4-butan-4'-olpyridine is used in place of the 2-propan-3-olpyridine acetate and 4-butan-4'-olpyridine-N-oxide is recovered.

EXAMPLE 5

*2-ethan-2-ol-5-ethylpyridine-N-oxide [2-(5-ethylpyridine)-ethan-2-ol, N-oxide]*

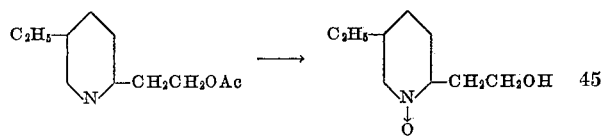

The procedure of Example 1 is repeated save that the acetate of 2-ethan-2-ol-5-ethylpyridine is used in place of 2-propan-3-olpyridine, and the product recovered is 2-ethan-2-ol-5-ethylpyridine-N-oxide.

EXAMPLE 6

*2,6-dimethyl-4-propan-3-olpyridine-N-oxide [4-(2,6-dimethyl-pyridine)-propan-3-ol, N-oxide]*

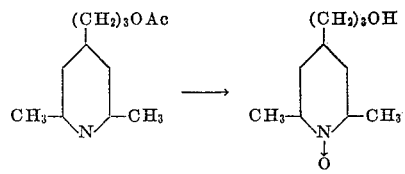

The procedure of Example 1 is repeated save that the acetate of 2,6-dimethyl-4-propan-3-olpyridine is used in place of the 2-propan-3-ol acetate and the product recovered is 2,6-dimethyl-4-propan-3-olpyridine-N-oxide.

While I prefer to dissolve my alkanolpyridine ester in acetic acid and oxidize with hydrogen peroxide, I can carry out my oxidation in other ways. Thus, I can dissolve the alkanolpyridine ester in benzene and use monoperphthalic acid as my oxidizing agent, or I may use perbenzoic acid as the oxidizing agent.

As an example of the manner in which the alkanolpyridine-N-oxides may be used to prepare pyridyl glycols, I cite the following: To 250–300 pounds of refluxing acetic anhydride add 150 pounds of 2-propan-3-olpyridine-N-oxide. The addition should be made in small portions as considerable heat is evolved by the reaction of the 2-propanolpyridine-N-oxide with the acetic anhydride. When all of the -N-oxide has been added, the resulting solution is maintained at refluxing temperature for about two hours. Then the solution is subjected to vacuum distillation to remove the unreacted acetic anhydride. To the residue remaining after the acetic anhydride has been removed, there is added about 750–1,000 parts of an aqueous caustic soda solution. The resulting mixture is heated at reflux conditions for about four to six hours. Then the mixture is cooled and thoroughly extracted with about 350 to 500 parts of diethyl ether. The ether extract contains the 1-(2-pyridyl)propandiol 1:3 which was found during the preceding reaction. The ether solution is dried and then the ether is removed by vacuum distillation. There remains an oily residue of 1-(2-pyridyl)-propandiol 1:3.

I claim as my invention:

1. The process of preparing alkanolpyridine-N-oxides which compounds may be represented by the following general formula:

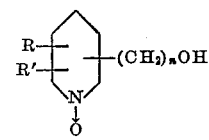

where $n$ is 2 to 4 and R and R' are selected from the class consisting of hydrogen and lower alkyl, which comprises oxidizing at an elevated temperature an alkanolpyridine ester with a compound of the class consisting of a peracid and hydrogen peroxide and recovering the alkanolpyridine-N-oxide.

2. Alkanolpyridine-N-oxides having the following general formula:

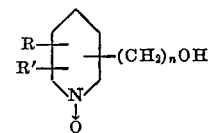

where $n$ is 2 to 4 and R and R' are selected from the class consisting of hydrogen and lower alkyl.

3. The process of preparing alkanolpyridine-N-oxides which compounds may be represented by the following general formula:

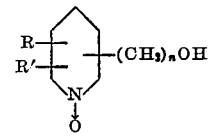

where $n$ is 2 to 4 and R and R' are selected from the class consisting of hydrogen and lower alkyl, which comprises reacting an acetic acid solution of an alkanolpyridine acetate with hydrogen peroxide and recovering the alkanolpyridine-N-oxide.

4. The process of preparing a propanol-pyridine-N-oxide which comprises reacting propanolpyridine acetate with hydrogen peroxide and recovering propanol-pyridine-N-oxide.

5. The compound 2-pyridine-propan-3-ol, N-oxide.

6. The compound 2-pyridine-ethan-2-ol, N-oxide.

7. The compound 4-pyridine-propan-3-ol, N-oxide.

References Cited in the file of this patent

UNITED STATES PATENTS 2,540,218    Shaw _____ Feb. 16, 1951